(12) United States Patent
Turtinen et al.

(10) Patent No.: US 8,588,690 B2
(45) Date of Patent: Nov. 19, 2013

(54) DISCOVERY IN DEVICE-TO-DEVICE COMMUNICATION

(75) Inventors: Samuli Turtinen, Ii (FI); Sami-Jukka Hakola, Kempele (FI); Timo K. Koskela, Oulu (FI)

(73) Assignee: Renesas Mobile Corporation, Tokyo (JP)

( * ) Notice: Subject to any disclaimer, the term of this patent is extended or adjusted under 35 U.S.C. 154(b) by 48 days.

(21) Appl. No.: 13/295,282

(22) Filed: Nov. 14, 2011

(65) Prior Publication Data

US 2013/0122893 A1 May 16, 2013

(30) Foreign Application Priority Data

Nov. 11, 2011 (GB) .................................. 1119512.0

(51) Int. Cl.
*H04B 7/00* (2006.01)

(52) U.S. Cl.
USPC ........... 455/41.2; 370/328; 455/458; 455/515

(58) Field of Classification Search
USPC ........................................ 455/458, 41.2, 515
See application file for complete search history.

(56) References Cited

U.S. PATENT DOCUMENTS

| 2008/0268878 | A1 | 10/2008 | Wang et al. | 455/458 |
| 2009/0017843 | A1* | 1/2009 | Laroia et al. | 455/458 |
| 2010/0009643 | A1* | 1/2010 | Haartsen | 455/127.5 |
| 2010/0151897 | A1 | 6/2010 | Li et al. | 455/522 |
| 2012/0269173 | A1* | 10/2012 | Chin et al. | 370/332 |

FOREIGN PATENT DOCUMENTS

| WO | WO2010/025774 A1 | 3/2010 |
| WO | WO2010/110999 A1 | 9/2010 |

OTHER PUBLICATIONS

"On the need for a 3GPP study on LTE device-to-device discovery and communication", Qualcomm Incorporated, 3GPP TSG-RAN #52, RP-110706, May-Jun. 2011, 2 pgs.
"Study on LTE Device to Device Discovery and Communication-Radio Aspects", TSG-RAN #52, RP-110707, May-Jun. 2011, 5 pgs.
"Study on LTE Device to Device Discovery and Communication-Service and System Aspects", TSG-RAN #52, RP-110708, May-Jun. 2011, 5 pgs.
"$3^{rd}$ Generation Partnership Project; Technical Specification Group Radio Access Network; Evolved Universal Terrestrial Radio Access (E-UTRA); User Equipment (UE) procedures in idle mode (Release 10)", 3GPP TS 36.304 V10.1.0, Mar. 2011, 33 pgs.
"$3^{rd}$ Generation Partnership Project; Technical Specification Group Radio Access Network; Evolved Universal Terrestrial Radio Access (E-UTRA); Radio Resource Control (RRC); Protocol specification (Release 10)", 3GPP TS 36.331 V10.0.0, Dec. 2010, 276 pgs.

(Continued)

*Primary Examiner* — Vladimir Magloire

(57) ABSTRACT

The specification and drawings present a new method, apparatus and software related product (e.g., a computer readable memory) for discovery of D2D devices in wireless communications, e.g., LTE systems by relating beacon/discovery resources to paging frames, so that the UE may save power being active (e.g., in the wake-up state) only during paging frames. The user equipment may receive during a paging receiving time a paging signal from the wireless network and at least one discovery signal from at least one user equipment operating in the wireless network, wherein a discovery cycle period of the at least one discovery signal is different than the paging cycle period and is determined using the paging cycle period based on a predefined rule.

20 Claims, 7 Drawing Sheets

(56) References Cited

OTHER PUBLICATIONS

"Future of Wireless? The Proximate Internet", Rajiv Laroia, COMSNETS, Jan. 7, 2010, 38 pgs.

EP Combined Search and Examination Report under Sections 17 and 18(3) issued for corresponding GB Patent Application No. GB1119512.0 mailed Mar. 7, 2012.

* cited by examiner

DISCOVERY IN DEVICE-TO-DEVICE COMMUNICATION

RELATED APPLICATIONS

This application claims priority to UK Patent Application Number 1119512.0 filed on Nov. 11, 2011.

TECHNICAL FIELD

The exemplary and non-limiting embodiments of this invention relate generally to wireless communications and more specifically to implementing discovery of D2D devices in wireless communications, e.g., LTE systems.

BACKGROUND ART

The following abbreviations that may be found in the specification and/or the drawing figures are defused as follows:
3GPP Third Generation Partnership Project
CDM Code Division Multiplexing
CMAS Commercial Mobile Alert System
D2D Device-to-Device
DL Downlink
DRX Discontinuous Reception
eNB Evolved Node B/Base Station in an EUTRAN System
EUTRAN Evolved UTRAN (LTE)
ETWS Earthquake and Tsunami Warning System
FDD Frequency Division Duplex
FDM Frequency Division Multiplexing
ID Identification
IMSI International Mobile Subscriber Identity
IP Internet Protocol
ISM Industrial, Scientific, Medical
LTE Long Term Evolution
LTE-A Long Term Evolution Advanced
MME Mobility Management Entity
PDCCH Physical Downlink Control Channel
PDSCH Physical Downlink Shared Channel
PF Paging Frame
PO Paging Occasion
P-RNTI Paging Radio Network Temporary Identifier
RRC Radio Resource Control
SFN System Frame Number
SIB System Information Block
TDD Time Division Duplex
TDM Time Division Multiplexing
UE User Equipment
UL Uplink
UTRAN Universal Terrestrial Radio Access Network The device-to-device (D2D) communication may enable new service opportunities and reduce the eNB load for short range data intensive peer-to-peer communications. Qualcomm has proposed a study item for the D2D in 3GPP TSG-RAN #52 plenary, 31 May-3 Jun. 2011, e.g., see Tdoc-RP-110706, "On the need for a 3GPP study on LTE device-to-device discovery and communication", Qualcomm Incorporated, 3GPP TSG-RAN #52, Bratislava Slovakia May 31-Jun. 3, 2011; Tdoc-RP-110707, "Study on LTE Device to Device Discovery and Communication—Radio Aspects, "Qualcomm Incorporated, 3GPP TSG-RAN #52, Bratislava Slovakia May 31-Jun. 3, 2011; Tdoc-RP-110708, "Study on LTE Device to Device Discovery and Communication—Service and System Aspects," Qualcomm Incorporated, 3GPP TSG-RAN #52, Bratislava Slovakia May 31-Jun. 3, 2011.

One of the main targets is to evolve the LTE platform in order to intercept the demand of proximity-based applications by studying enhancements to the LTE radio layers that allow devices to discover each other directly over the air, and potentially communicate directly, when this makes sense from a system management point of view, upon appropriate network supervision.

The 3GPP TSG-RAN #52 document Tdoc-RP-110706, cited above, states as follows: "This radio-based discovery process needs also to be coupled with a system architecture and a security architecture that allow the 3GPP operators to retain control of the device behavior, for example who can emit discovery signals, when and where, what information do they carry, and what devices should do once they discover each other."

Heterogeneous local communication plays also a vital role in the future wireless networking as can be ascertained from recently published press releases of the Qualcomm's FlashlinQ concept (http://www.cedt.iisc.ernet.in/people/kuri/Comsnets/Keynotes/Keynote-Raiiv-Laroia.pdf, last visited on Oct. 21, 2011).

It can be assumed that the D2D discovery is also to be supported in RRC_IDLE state in which there is no RRC connection towards the eNB but the device has a valid IP address, it has been authenticated and its security context is stored in the MME. RRC_IDLE mode provides an opportunity to have power efficient state for low duty cycle discovery and service advertisement signaling by the D2D devices while being authenticated by the serving network (which should allow autonomous signal transmission on certain resources).

To receive paging messages from EUTRAN, UEs in RRC_IDLE mode monitor the PDCCH channel for a P-RNTI used to indicate paging. The UE only needs to monitor the PDCCH channel at certain UE-specific occasions (i.e., at specific subframes within specific radio frames. At other times, the UE may apply DRX, meaning that it can switch off its receiver to preserve battery power.

Radio/physical layer D2D discovery method for RRC_IDLE mode anticipates UEs to wake up during both D2D discovery resource and paging occasions. It means that the UE's paging channel occurs in a different frame than D2D discovery resources requiring the second UE to wake up listening to different frames at different times.

Paging in LTE system in 3GPP TS 36.304 V10.1.0, "User Equipment (UE) procedures in idle mode" is described as follows:

"One Paging Occasion (PO) is a subframe where there may be P-RNTI transmitted on PDCCH addressing the paging message. One Paging Frame (PF) is one Radio Frame, which may contain one or multiple Paging Occasion(s). When DRX is used the UE needs only to monitor one PO per DRX cycle. PF and PO is determined by following formula using the DRX parameters provided in System Information:
PF is given by following equation:

$$\text{SFN mod } T = (T \text{ div } N)*(UE\_ID \text{ mod } N)$$

Index i_s pointing to PO from subframe pattern will be derived from following calculation:

$$i\_s = \text{floor}(UE\_ID/N) \text{ mod } Ns$$

T: DRX cycle of the UE. T is determined by the shortest of the UE specific DRX value, if allocated by upper layers, and a default DRX value broadcast in system information. If UE specific DRX is not configured by upper layers, the default value is applied.

nB: 4T, 2T, T, T/2, T/4, T/8, T/16, T/32.
N: min(T,nB)
Ns: max(1,nB/T)
UE_ID: IMSI mod 1024."

The 3GPP TS 36.331 V10.0.0, "Radio Resource Control (RRC)" describes that in RRC_IDLE mode, the UE monitors a Paging channel to detect incoming calls, system information change, for ETWS capable UEs, ETWS notification, and for CMAS capable UEs, CMAS notification.

The 3GPP TS 36.331 V10.0.0, "Radio Resource Control (RRC)" describes that in RRC_CONNECTED mode, the UE Monitors a Paging channel and/or System Information Block Type 1 contents to detect system information change, for ETWS capable UEs, ETWS notification, and for CMAS capable UEs, CMAS notification.

SUMMARY

According to a first aspect of the invention, a method comprises: receiving by a user equipment from a wireless network paging information including a paging cycle period; and monitoring by the user equipment during a common frame defined by the paging cycle period for a paging signal from the wireless network and for at least one discovery signal from at least one user equipment operating in the wireless network, wherein a discovery cycle period of the at least one discovery signal is different than the paging cycle period and is determined using the paging cycle period based on a predefined rule.

According to a second aspect of the invention, an apparatus comprises: at least one processor and a memory storing a set of computer instructions, in which the processor and the memory storing the computer instructions are configured to cause the apparatus to: receive from a wireless network paging information including a paging cycle period; and monitor by the user equipment during a common frame defined by the paging cycle period for a paging signal from the wireless network and for at least one discovery signal from at least one user equipment operating in the wireless network, wherein a discovery cycle period of the at least one discovery signal is different than the paging cycle period and is determined using the paging cycle period based on a predefined rule.

According to a third aspect of the invention, a computer readable memory encoded with a computer program comprising computer readable instructions recorded thereon for execution a method comprising: receiving by a user equipment from a wireless network paging information including a paging cycle period; and monitoring by the user equipment during a common frame defined by the paging cycle period for a paging signal from the wireless network and for at least one discovery signal from at least one user equipment operating in the wireless network, wherein a discovery cycle period of the at least one discovery signal is different than the paging cycle period and is determined using the paging cycle period based on a predefined rule.

According to a fourth aspect of the invention, a method comprises: sending by at least one network element of a wireless network to a plurality of user equipments paging information including a paging cycle period; and determining and providing by the at least one network element to the plurality of user equipments one or more discovery cycle periods for sending discovery signals, wherein each of the one or more discovery cycle periods is different than the paging cycle period and is determined using the paging cycle period based on a predefined rule.

According to a fifth aspect of the invention, an apparatus comprises: at least one processor and a memory storing a set of computer instructions, in which the processor and the memory storing the computer instructions are configured to cause the apparatus to: send to a plurality of user equipments paging information including a paging cycle period; and determine and provide to the plurality of user equipments one or more discovery cycle periods for sending discovery signals, wherein each of the one or more discovery cycle periods is different than the paging cycle period and is determined using the paging cycle period based on a predefined rule.

According to a sixth aspect of the invention, a computer readable memory encoded with a computer program comprising computer readable instructions recorded thereon for execution a method comprising: sending by at least one network element of a wireless network to a plurality of user equipments paging information including a paging cycle period; and determining and providing by the at least one network element to the plurality of user equipments one or more discovery cycle periods for sending discovery signals, wherein each of the one or more discovery cycle periods is different than the paging cycle period and is determined using the paging cycle period based on a predefined rule.

According to a seventh aspect of the invention, a method comprises: receiving by a user equipment from a wireless network paging information including a paging cycle period; and sending a discovery signal by the user equipment to other user equipments in the wireless network, wherein a discovery cycle period of the discovery signal is different than the paging cycle period and is determined using the paging cycle period based on a predefined rule.

BRIEF DESCRIPTION OF THE DRAWINGS

For a better understanding of the nature and objects of the present invention, reference is made to the following detailed description taken in conjunction with the following drawings, in which.

DETAILED DESCRIPTION

A new method, apparatus, and software related product (e.g., a computer readable memory) are presented for implementing discovery of D2D devices in wireless communications, e.g., LTE wireless systems by relating beacon/discovery resources to paging frames, so that the UE may save power which is being active (e.g., in the wake-up state) only during paging frames.

Figure 1:
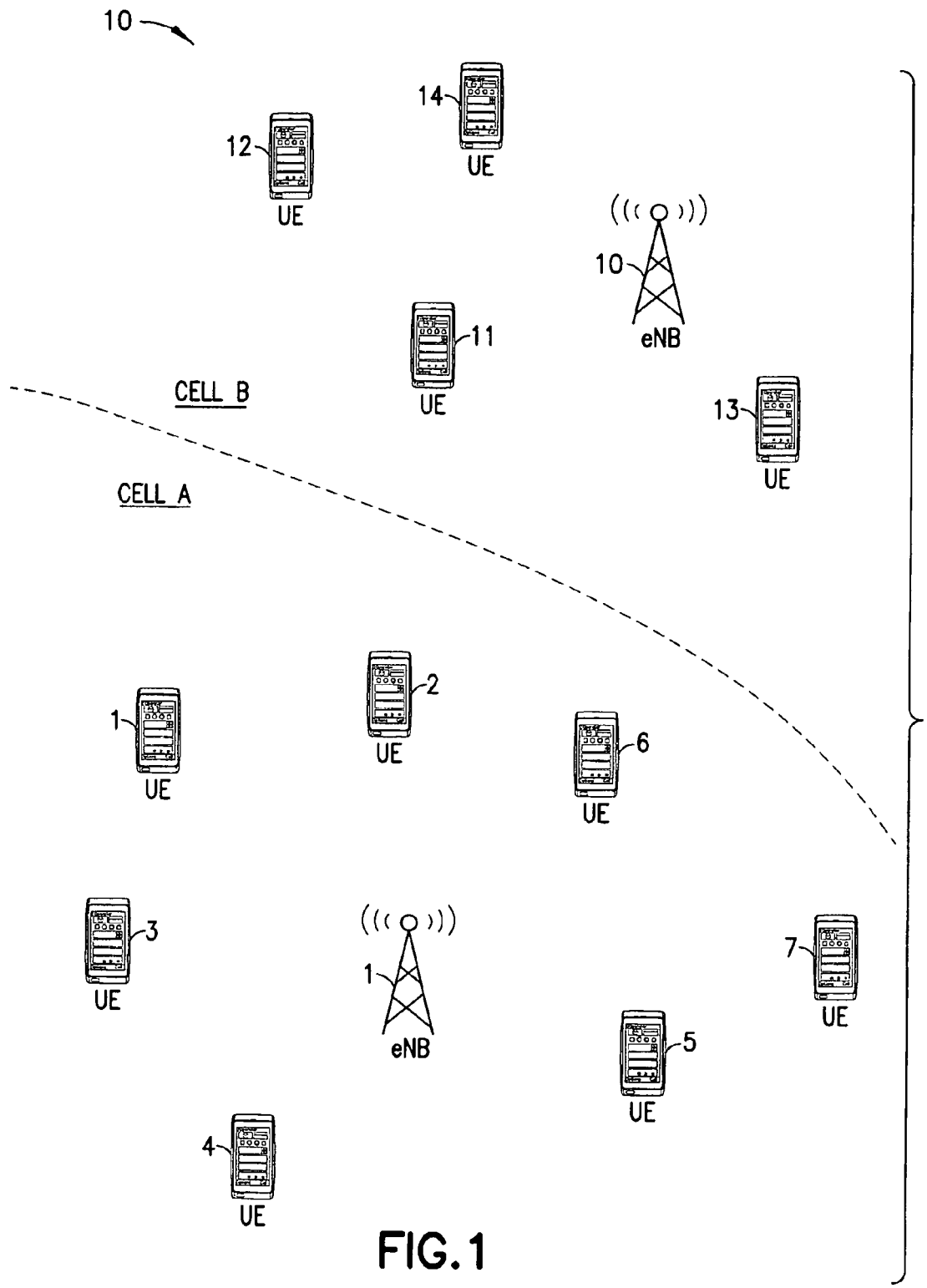
FIG. 1 is a schematic diagram showing a wireless system with a group of seven UEs under one cell A and adjacent to another cell B with four UEs, in which exemplary embodiments detailed herein, may be practiced to advantage.

FIG. 1 illustrates an exemplary wireless network 10 in which embodiments of these teachings may be practiced to advantage. Seven UEs, UE1-UE7, are under one cell A with eNB1 and adjacent to another cell B with eNB10 having four UEs UE11-UE14. The discovery signal for D2D communication may be sent by any of the UE1-UE7 or UE11-UE14 to some other UE/UEs shown in FIG. 1 to establish D2D communication. It is further noted that in LTE wireless systems, FDM, TDM and CDM are all available which may provides the possibility to increase the discovery signal multiplexing capacity.

According to an embodiment of the invention, D2D beacon/discovery resources may be configured in a wireless network so that they may occur during paging frames (e.g., in every paging frame or selected paging frames) of a corresponding cell. More specifically the D2D beacon/discovery resources having specific interval/cycle may recur in time which is a function of cell specific paging parameters. In LTE wireless systems, the common cell specific paging parameters may be broadcasted in System Information (e.g., in SIB2).

Furthermore, the cycle period for the D2D beacon/discovery resources may be derived from paging cycle (e.g., a common default paging cycle) parameters configured by the network. For example, the cycle between the D2D beacon/discovery resources may be configured by the network. This D2D discovery cycle may be shorter or longer than the default paging cycle configured by the network.

For example, a network element (e.g., eNB1 in FIG. 1) can configure and send to a plurality of UEs in a cell (e.g., UE1-UE7 in cell A) paging information including a paging cycle period and discovery (or pilot) signal information including one or more discovery cycle periods for the UEs to send discovery signals, wherein each of the one or more discovery cycle periods is different than the paging cycle period and is determined using the paging cycle period based on a predefined rule. It is further noted that the network element may assign the discovery cycle period individually to each UE, assign the same discovery cycle period to all UEs, or provide a few values of the discovery cycle period to choose from by the UEs. Also, the network element may provide the predefined rule how to determine the discovery cycle period, so that the discovery cycle period may be determined by each UE based on that rule.

Based on the received information, each of the plurality of UEs (e.g., UE1-UE7 in cell A) may send a discovery signal (using an appropriate discovery cycle period) to other UEs in close proximity in the wireless network. Also, each of the plurality of UEs (e.g., UE1-UE7 in cell A) may receive a paging signal during a paging receiving time (determined by a paging frame or a common frame defined by the paging cycle period of the paging signal) from the wireless network and at least one discovery signal from at least one UE of the UEs sending their discovery signals using appropriate discovery cycle period(s). The UE receiving both paging and discovery signals during the paging receiving time (or paging frame) may use one receiver having capabilities for receiving both signals (paging and discovery signals), e.g., using any known multiplexing methods (e.g., FDM, TDM and CDM), or the UE may use different receivers. For example, the user equipment may use two receivers: one receiver to receive the paging signal and another receiver is to receive the at least one discovery signal (having a different physical channel than the paging signal) during a paging receiving time determined by the common frame. The UE should know the resource information of the discovery signal, which may be a known system parameter or may be assigned by the network element and signaled to the UEs.

Figure 2:
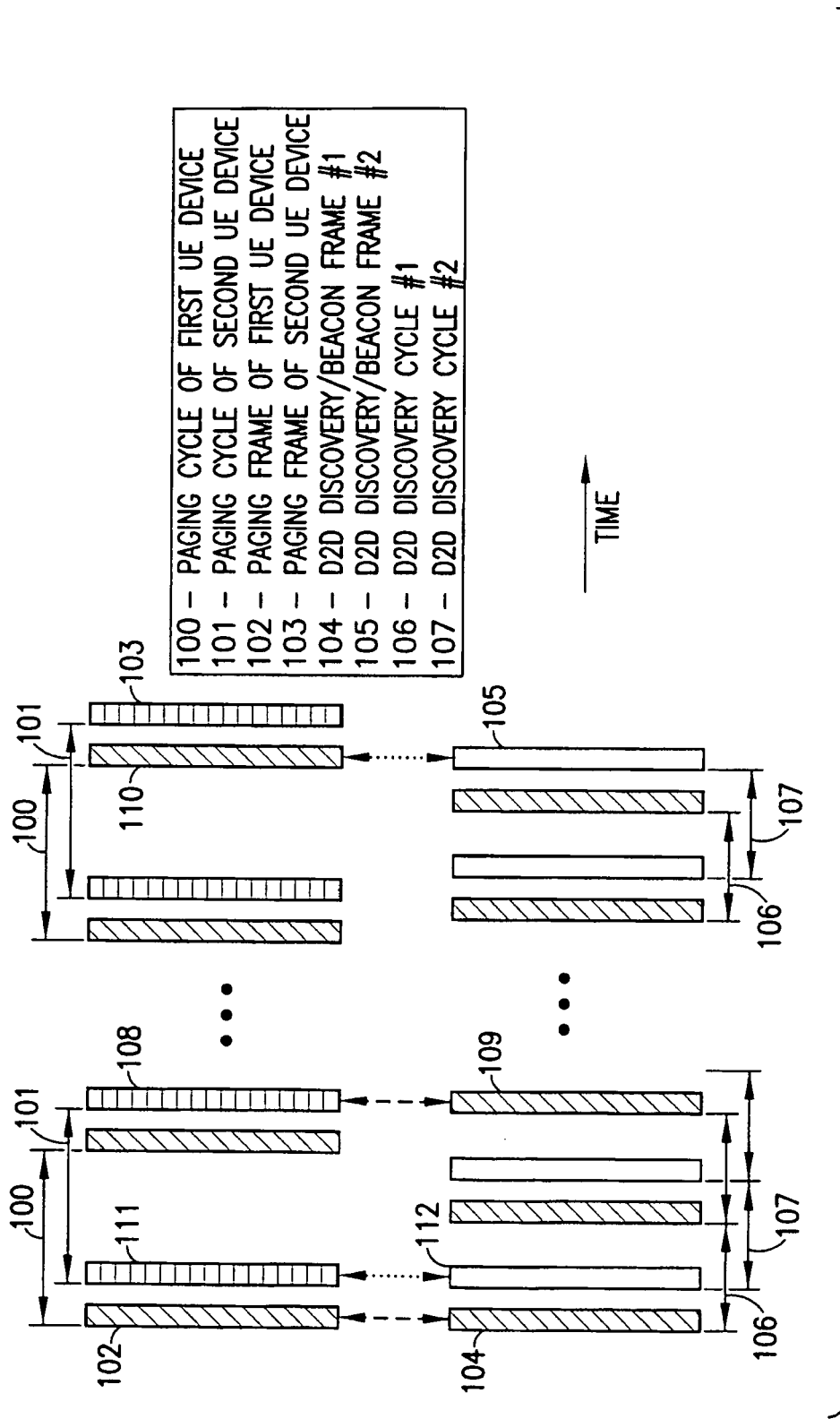
FIGS. 2-4 are time diagrams of paging and discovery frames/signals illustrating exemplary embodiment of the invention.
Figure 3:
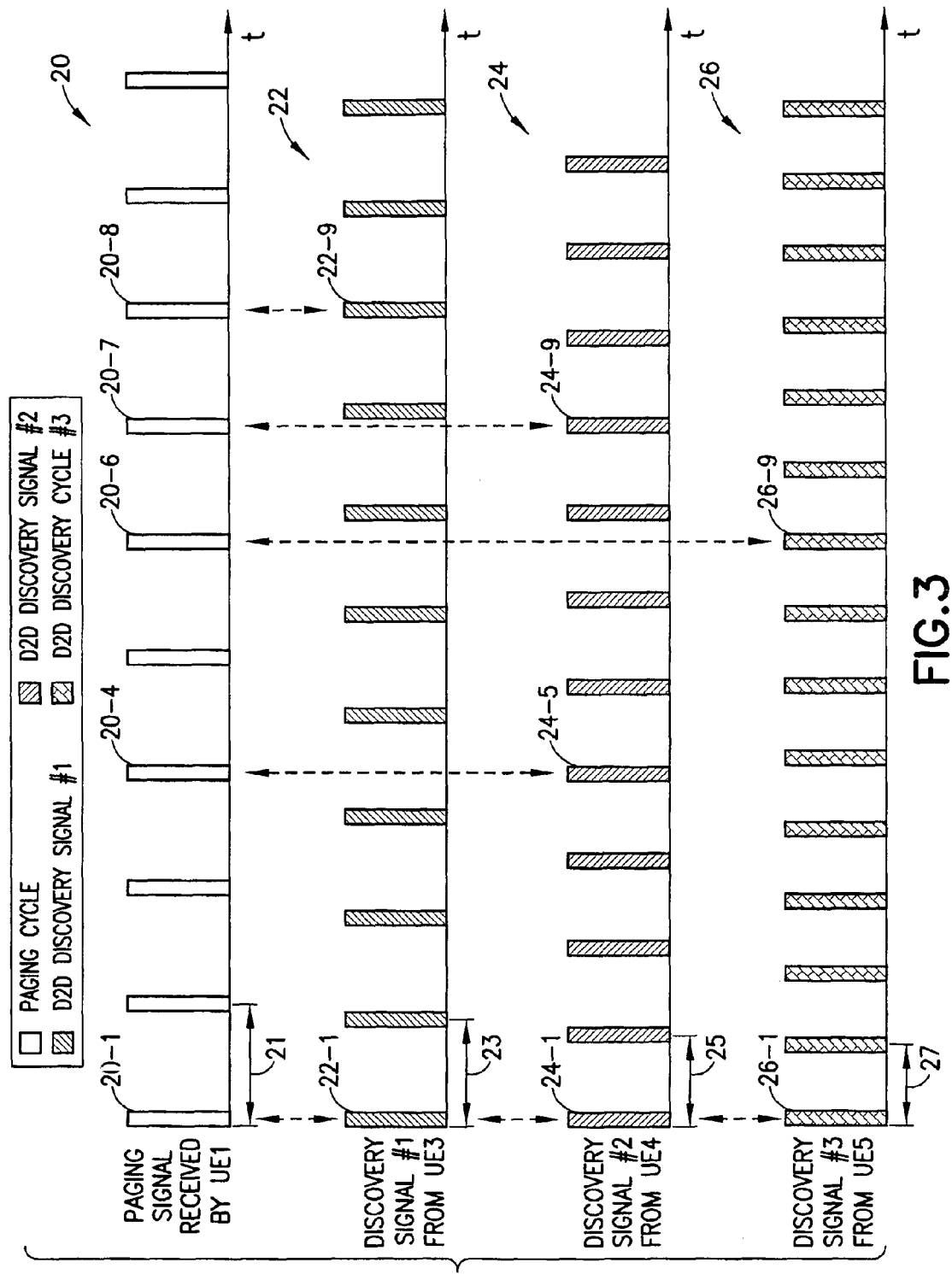
Figure 4:
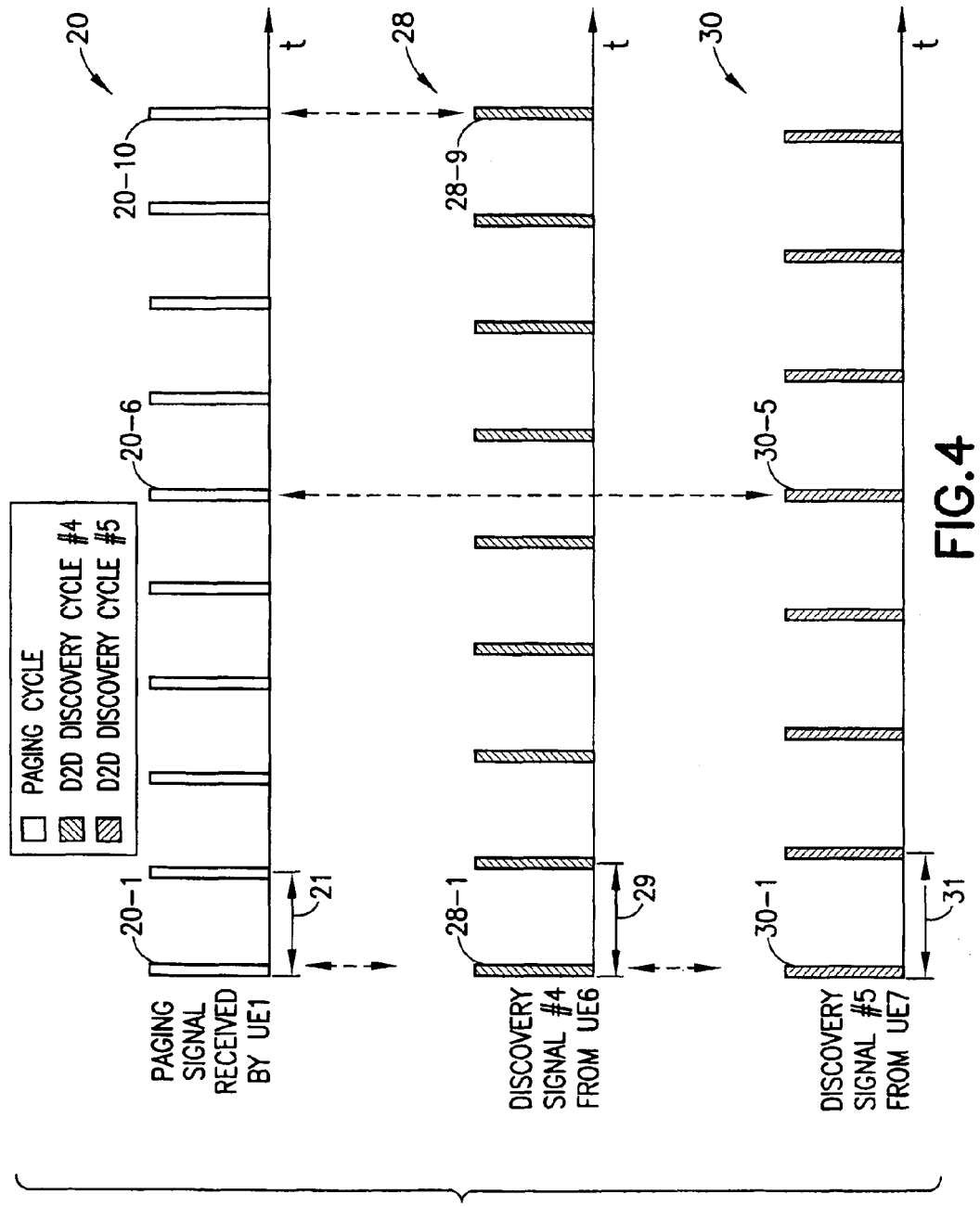

FIGS. 2-4 illustrate exemplary embodiments for practicing the invention.

FIG. 2 shows an example where two time streams of radio frames for two UEs (e.g., UE1 and UE2 in FIG. 1). For the UE1 and UE2 being in the same cell (e.g., in cell A shown in FIG. 1) paging cycles (or cycle periods) 100 and 101 are equal. The top stream shows paging frames (or signals) 102 and 103 with paging cycles 100 and 101 received by the UE1 and UE2, respectively. The bottom stream shows two discovery (or beacon) frames/signals 104 and 105, with corresponding discovery cycles (or cycle periods) 106 and 107, generated, for example, by the UE3 and UE4 in FIG. 1 and received by the UE1 and UE2, respectively.

The discovery cycles (or cycle periods) 106 and 107 may have different or the same values but different than the paging cycles, 100 and 101, according to embodiments of the invention. It is seen from FIG. 2 that during the paging frame 102 the UE1 receives the discovery frame 104 from the UE3 and during paging frame 110 the UE1 receives the discovery frame 105 from the UE4.

Similarly, the UE2 receives during the paging frame 111 the discovery frame 112 from the UE4 and during the paging frame 108 the discovery frame 109 from the UE3.

FIG. 3 shows an example of four time streams of radio frames/signals (paging and discovery) in time received, e.g., by the UE1 (e.g., see FIG. 1). The top stream shows paging frames (or signals) 20 with a paging cycle period 21 received by the UE1. The duty cycle for the paging signals is chosen to be ⅛ for this example (i.e., the ratio of duration of a paging frame to the paging cycle period 21 equals to ⅛).

The second stream from the top in FIG. 3 shows discovery frames/signals 22 with a corresponding discovery cycle period 23, e.g., from the UE3. The discovery cycle period 23 is reduced by the duration of the paging frame (the duration of the discovery signal/frame is assumed to be equal to the duration of the paging frame). As it is seen from FIG. 3, if the paging frame 20-1 and the discovery frame 22-1 are captured by the UE1 at the occurrence of the paging frame 20-1, then the next such occurrence will happen when the paging frame 20-8 and the discovery frame 22-9 are captured by the UE1. In other words, at every eighth paging frame there will be a coincidence of one of the paging frames 20 and one of the discovery frames 22 so the UE1 can wake for a single frame to detect both LTE paging and D2D discovery beacons.

The third stream from the top in FIG. 3 shows discovery frames/signals 24 with a corresponding discovery cycle period 25, e.g., from the UE4. The discovery cycle period 25 is reduced by two times the duration of the paging frame (the duration of the discovery signal/frame is assumed to be equal to the duration of the paging frame). As it is seen from FIG. 3, if the paging frame 20-1 and the discovery frame 24-1 are captured by the UE1 at the occurrence of the paging frame 20-1, then the next such occurrence will happen when the paging frame 20-4 and the discovery frame 24-5 are captured by the UE1, and the next occurrence will happen when the paging frame 20-7 and the discovery frame 24-9 are captured by the UE1. In other words, every fourth paging frame there will be a coincidence of one of the paging frames 20 and one of the discovery frames 24 so the UE1 can wake for a single frame to detect both LTE paging and D2D discovery beacons.

The fourth stream from the top (or the bottom stream) in FIG. 3 shows discovery frames/signals 26 with a corresponding discovery cycle period 27, e.g., from the UE5. The discovery cycle period 27 is reduced by three times the duration of the paging frame (the duration of the discovery signal/frame is assumed to be equal to the duration of the paging frame). As it is seen from FIG. 3, if the paging frame 20-1 and the discovery frame 26-1 are captured by the UE1 at the occurrence of the paging frame 20-1, then the next such occurrence will happen when the paging frame 20-6 and the discovery frame 26-9 are captured by the UE1. In other words, every sixth paging frame there will be a coincidence of one of the paging frames 20 and one of the discovery frames 26 so the UE1 can wake for a single frame to detect both LTE paging and D2D discovery beacons.

It is seen in the example of FIG. 3 that the discovery frames 24 (third stream from the top) has the highest probability for the discovery signal to be captured during the paging frame (every fourth paging frame). Moreover, the discovery frames 22 (second stream from the top) has the lowest probability for the discovery signal to be captured during the paging frame (every eighth paging frame). The discovery frames 26 (fourth stream from the top) has the "medium" probability for the discovery signal to be captured during the paging frame (every sixth paging frame).

Also from the example shown in FIG. 3 it follows that by an appropriate choice of the discovery cycle period, the frequency of coincidence of the paging frame/signal and the discovery frame/signal may be changed. For example, if there is a heavy wireless communication traffic in the cell A (FIG. 1), then the network element eNB1 (or UE) may select the discovery cycle period 22 (the second stream from the top) where every eighth paging frame it will be a coincidence of one of the paging frames 20 and one of the discovery frames 22, e.g., to minimize interference of discovery signals from different UEs (i.e., the interference may occur when the discovery signals from different UEs are captured during the same paging frame). In other words, it may be a trade-off between reducing interference and maximizing probability of capturing the discovery signals.

On the other hand if the wireless traffic is light in the cell A, then the best selection may be the discovery cycle period 24 (the third stream from the top) where every fourth paging frame it will be a coincidence of one of the paging frames 20 and one of the discovery frames/signals 24, e.g., to maximize the probability of captioning by the UE1 the desired discovery signal when the possible interference is small.

FIG. 4 is another example showing three time streams of radio frames/signals (paging and discovery) in time received, e.g., by the UE1 (see FIG. 1). The top stream shows paging frames (or signals) 20 with a paging cycle period 21 received by the UE1 (it is the same as the top stream in FIG. 3). The duty cycle for the paging signals is chosen to be ⅛ for this example (i.e., the ratio of duration of a paging frame to the paging cycle period 21 equals to ⅛).

The second stream from the top in FIG. 4 shows discovery frames/signals 28 with a corresponding discovery cycle period 29, e.g., from the UE6 (see FIG. 1). The discovery cycle period 29 is increased by the duration of the paging frame (the duration of the discovery signal/frame is assumed to be equal to the duration of the paging frame). As it is seen from FIG. 4, if the paging frame 20-1 and the discovery frame 28-1 are captured by the UE1 at the occurrence of the paging frame 20-1, then the next such occurrence will happen when the paging frame 20-10 and the discovery frame 28-9 are captured by the UE1. In other words, every tenth paging frame it will be a coincidence of one of the paging frames 20 and one of the discovery frames 28 from the perspective of the UE1.

The third stream from the top in FIG. 4 shows discovery frames/signals 30 with a corresponding discovery cycle period 31, e.g., from the UE7. The discovery cycle period 31 is increased by two times the duration of the paging frame (the duration of the discovery signal/frame is assumed to be equal to the duration of the paging frame). As it is seen from FIG. 4, if the paging frame 20-1 and the discovery frame 30-1 are captured by the UE1 at the occurrence of the paging frame 20-1, then the next such occurrence will happen when the paging frame 20-6 and the discovery frame 30-5 are captured by the UE1. In other words, every fifth paging frame it will be a coincidence of one of the paging frames 20 and one of the discovery frames 30 from the perspective of the UE1.

It is seen in the example of FIG. 4 (similar to FIG. 3) that the discovery frames 30 (third stream from the top) has the higher probability for the discovery signal to be captured during the paging frame (every fifth paging frame). Moreover, the discovery frames 28 (second stream from the top) has the lower probability for the discovery signal to be captured during the paging frame (every tenth paging frame).

The choice of the appropriate discovery cycle period may be a trade-off between reducing interference and maximizing probability of capturing the discovery signals as explained in reference to FIG. 3 above. As shown in FIGS. 3 and 4, the discovery cycle period may be chosen to be smaller and/or larger than the paging period.

Thus, from above discussion it follows that the D2D beacon/discovery cycles (or discovery cycle periods) for different D2D transmitters (UEs) or services may have different values as discussed in reference to FIGS. 2-4. Furthermore, according to further embodiments these discovery cycle periods may be fixed in a certain time period for a plurality of UEs, flexible and configured by the network and/or by the UEs. For example, the network may periodically send updates for the discovery parameters such discovery cycle period based, e.g., on communication traffic conditions and/or other system parameters.

In a further embodiment, paging parameters of adjacent cells (e.g., in the LTE network) may be used for determining D2D discovery cycle parameters. For example, the discovery cycle duration may be derived/determined from the least or the greatest common denominator of the default paging cycle parameters over multiple adjacent cells. This may create an opportunity for establishing D2D wireless communication through the discovery process described herein between UEs in the multiple adjacent cells (e.g., between UEs of cells A and B in FIG. 1).

In another embodiment, when the D2D discovery transmitter device identifies itself to the network as being able to send D2D discovery signal, the network may inform via dedicated signaling about the shortest configured DRX cycle in the cell. In other words, the paging cycle period may be determined by a value of the discontinuous reception (DRX). The D2D transmitter may request the information from the network via RRC or any other dedicated signaling about discovery signaling.

In a still further embodiment, the D2D beacon/discovery resources for different services, e.g., broadcast or advertisement services, may be in different radio frames. In this case, the UE in D2D discovery state may derive the beacon/discovery frame of a certain service by utilizing the cell specific paging parameters and a specific ID/ID range allocated for that service.

Figure 5:
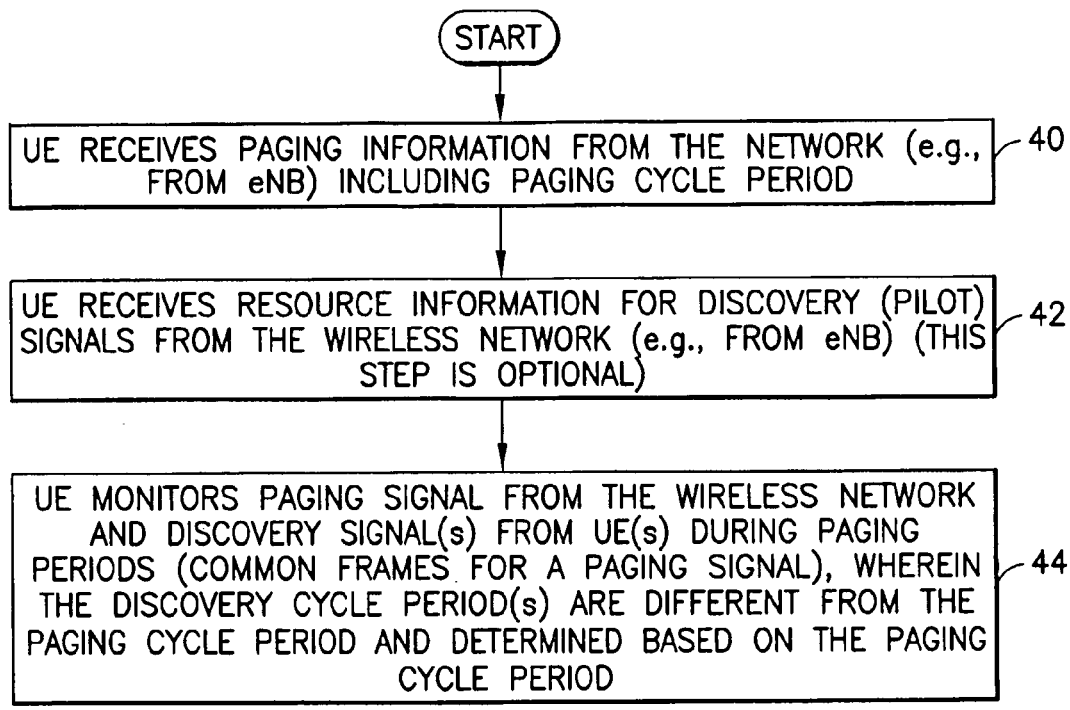
FIGS. 5-6 are flow charts demonstrating implementation of exemplary embodiments of the invention performed by a user equipment.

FIG. 5 shows an exemplary flow chart demonstrating receiving paging and discovery frames/signals, according to an exemplary embodiment of the invention. It is noted that the order of steps shown in FIG. 5 is not absolutely required, so in principle, the various steps may be performed out of the illustrated order. Also certain steps may be skipped, different steps may be added or substituted, or selected steps or groups of steps may be performed in a separate application.

In a method according to this exemplary embodiment, as shown in FIG. 5, in a first step 40, a UE (e.g., UE1 in FIG. 1) receives from a network (e.g., from the eNB1) paging information including the paging cycle period. In a next step 42, the UE receives resource information for the discovery signals from the wireless network (e.g., from eNB1). This step is optional because, alternatively, the UEs may already have that information (which may be preset or may be standardized). In a next step 44, the UE monitors a common frame for a paging signal from the wireless network and discovery signals from other UEs of the wireless network during all or selected paging periods, wherein the common frame is defined by the paging cycle period and the discovery cycle period(s) are different from the paging cycle period and determined based on the paging cycle period, per exemplary embodiments described herein (e.g., see FIGS. 2-4).

Figure 6:
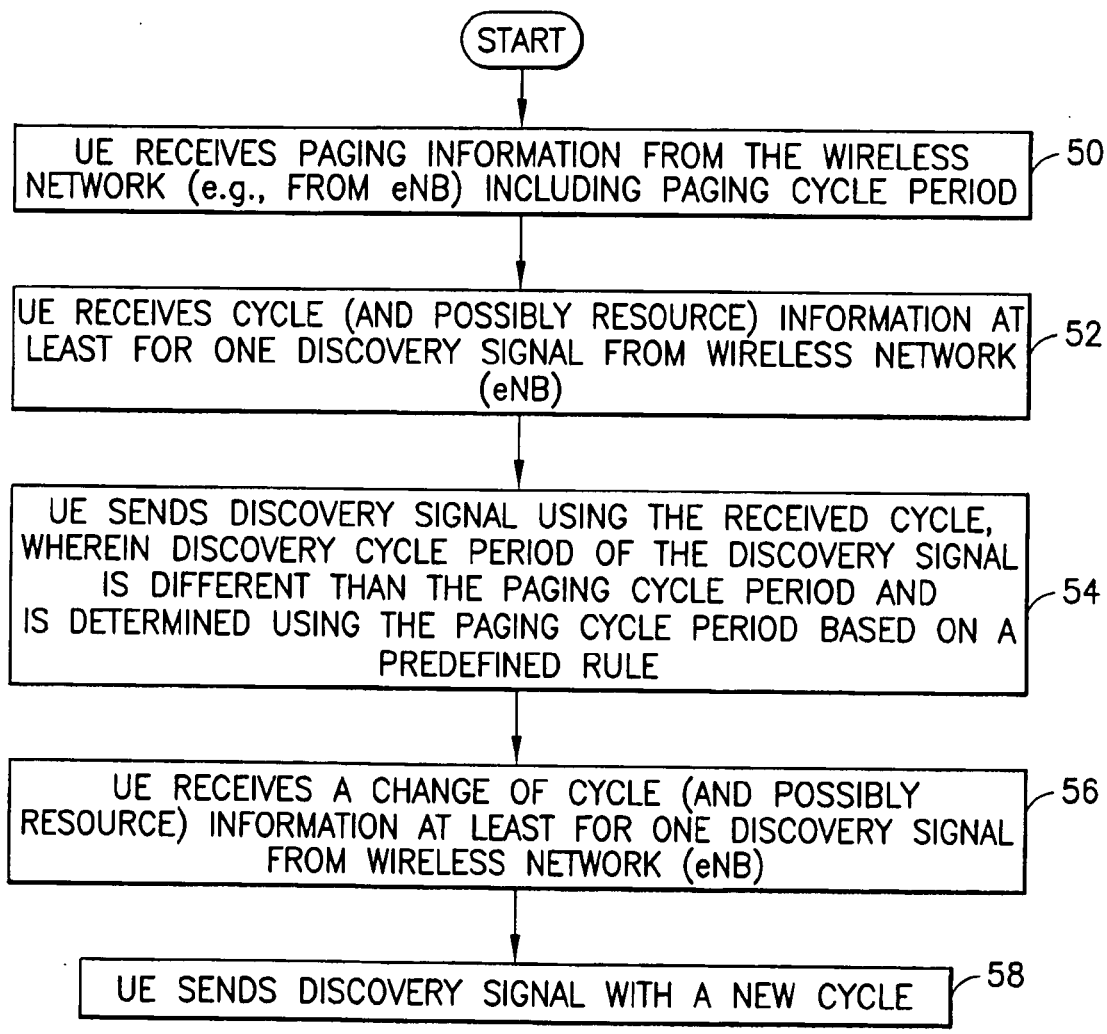

FIG. 6 shows an exemplary flow chart demonstrating sending a discovery signal, according to an exemplary embodiment of the invention. It is noted that the order of steps shown in FIG. 6 is not absolutely required, so in principle, the various steps may be performed out of the illustrated order. Also certain steps may be skipped, different steps may be added or substituted, or selected steps or groups of steps may be performed in a separate application.

In a method according to the exemplary embodiment, as shown in FIG. 6, in a first step 50, a UE (e.g., UE1 in FIG. 1) receives from a network (e.g., from the eNB1) paging information including the paging cycle period. In a next step 52, the UE receives from the wireless network (eNB1) the discovery cycle period and possibly resource information for at least one discovery signal. In a next step 54, the UE sends the discovery signal using the received discovery cycle period, wherein the discovery cycle period of the discovery signal is different than the paging cycle period and is determined using the paging cycle period based on a predefined rule, per exemplary embodiments described herein (e.g., see FIGS. 2-4).

In a next step 56, the UE receives from the wireless network (eNB1) a change of the discovery cycle period signal for this at least for one discovery signal. In a final step 58, the UE sends the discovery signal using the new received discovery cycle period.

Figure 7:
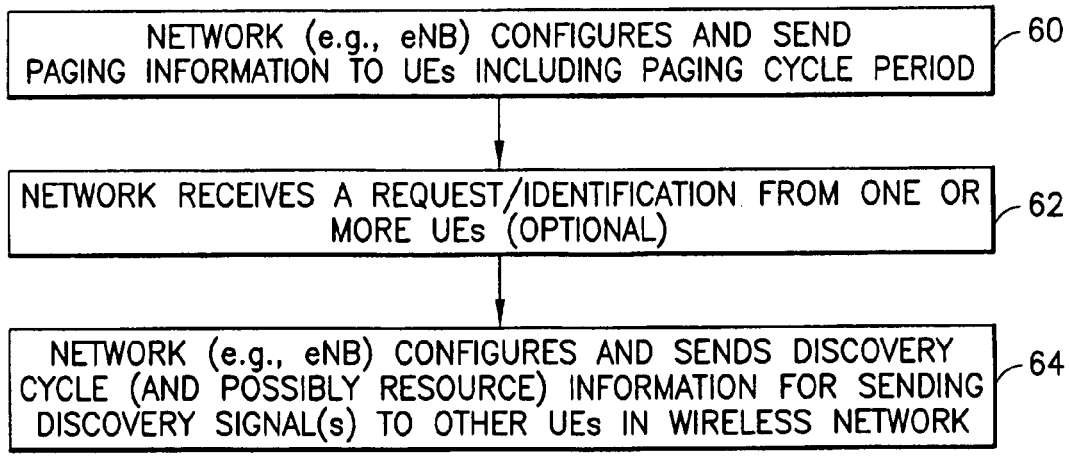
FIG. 7 is a flow chart demonstrating implementation of exemplary embodiments of the invention performed by a network element (e.g., eNB)

FIG. 7 shows an exemplary flow chart demonstrating network functionality for coordinating paging and D2D discovery processes in a wireless network, according to an exemplary embodiment of the invention. It is noted that the order of steps shown in FIG. 7 is not absolutely required, so in principle, the various steps may be performed out of the illustrated order. Also certain steps may be skipped, different steps may be added or substituted, or selected steps or groups of steps may be performed in a separate application.

In a method according to the exemplary embodiment, as shown in FIG. 7, in a first step 60, a network (e.g., eNB1 in FIG. 1) sends to the UE (e.g., UE1 in FIG. 1) paging information including the paging cycle period. In a next step 62, the network (eNB1) receives optionally a request/identification from one or more UEs (e.g., about discovery signaling). In a next step 64, the network (e.g., eNB1) configures and sends the discovery cycle period information (and optionally the resource information) for sending discovery signals to UEs in the wireless network as described herein.

Figure 8:
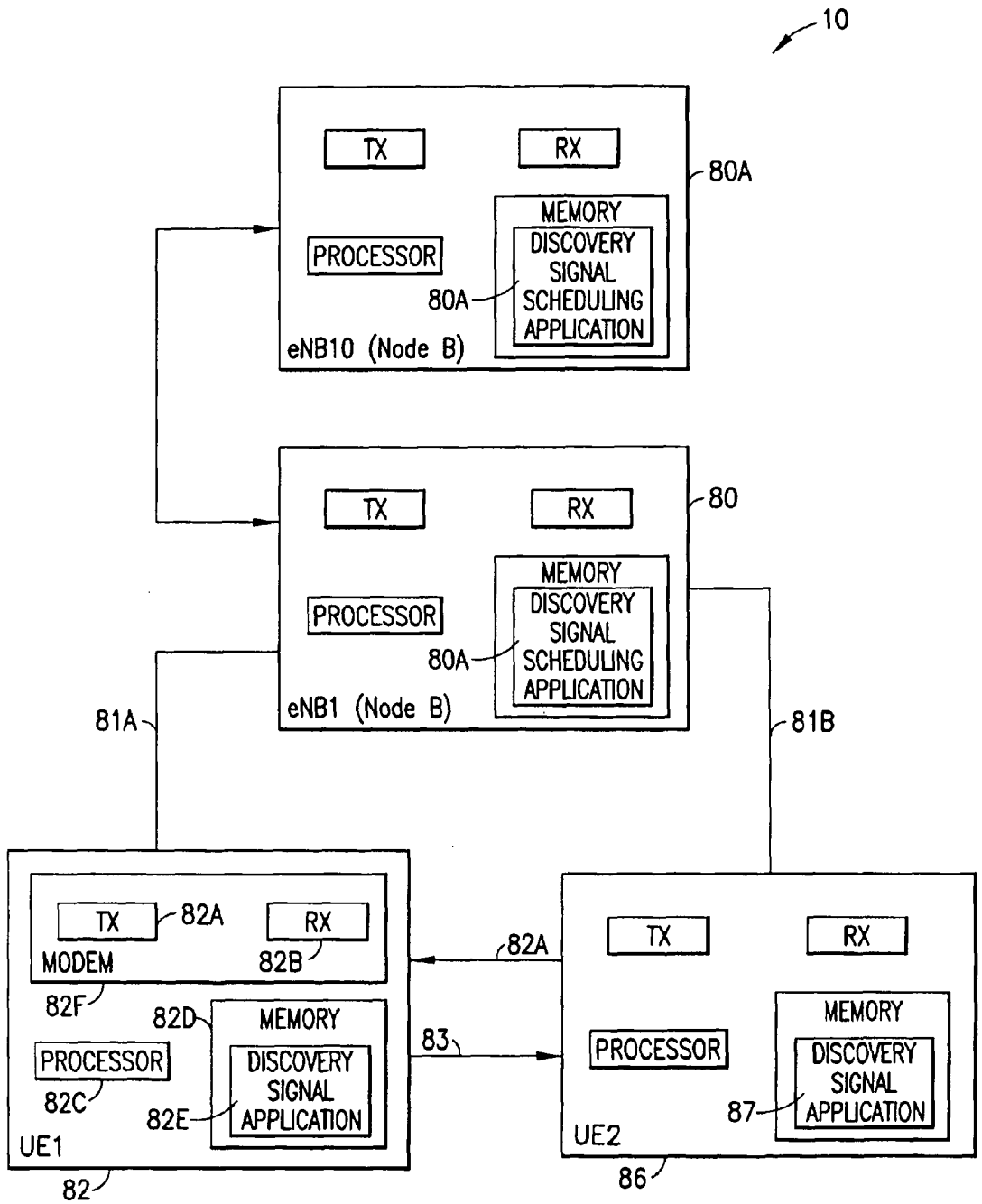
FIG. 8 is a block diagram of wireless devices for practicing exemplary embodiments of the invention.

FIG. 8 shows an example of a block diagram demonstrating LTE devices including an eNB1 80 and eNB10 80a, UE1 82 and UE2 86 is comprised in a wireless network 10, according to an embodiment of the invention. FIG. 8 is a simplified block diagram of various electronic devices and apparatus that are suitable for use in practicing the exemplary embodiments of this invention, e.g., in reference to FIGS. 1-7, and a specific manner in which components of an electronic device are configured to cause that electronic device to operate. Each of the UEs 82 and 86 may be implemented as a mobile phone, a wireless communication device, a camera phone, a portable wireless device and the like.

The UE1 82 may comprise, e.g., at least one transmitter 82a at least one receiver 82b, at least one processor 82c at least one memory 82d and a discovery signal application module 82e. The transmitter 82a and the receiver 82b and corresponding antennas (not shown in FIG. 8) may be configured to provide wireless D2D communications with UE-1 86 (and others not shown in FIG. 8) and with eNB1 80, respectively, according to the embodiment of the invention. The transmitter 82a and the receiver 82b may be generally means for transmitting/receiving and may be implemented as a transceiver, or a structural equivalence (equivalent structure) thereof. It is further noted that the same requirements and considerations are applied to transmitters and receivers of the devices 86, 80a and 80a.

Furthermore, the UE 1 82 may further comprise communicating means such as a modem 82f, e.g., built on an RF front end chip of the UE 82, which also carries the TX 82a and RX 82b for bidirectional wireless communications via data/control wireless links 81a, 83, 84a, for sending/receiving discovery signal and communicating with the eNB1 80. The same concept is applicable to other devices 80, 80a and 86 shown in FIG. 8.

Various embodiments of the at least one memory 82d (e.g., computer readable memory) may include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the processor 82c include but are not limited to general purpose computers, special purpose computers, microprocessors, digital signal processors (DSPs) and multi-core processors. Similar embodiments are applicable to memories and processors in other devices 86, 80a and 80a shown in FIG. 8.

The discovery signal application module 82e may provide instructions for generating, sending and/or receiving discovery signal as described herein and illustrated in FIGS. 1-7 (specifically see steps in FIGS. 5 and 6). For example, the discovery signal 83 may be sent to the UE2 86 and the signal 84a may be a discovery signal from the UE-2 86. The module 82e may be implemented as an application computer program stored in the memory 82d, but in general it may be implemented as a software, a firmware and/or a hardware module or a combination thereof. In particular, in the case of software or firmware, one embodiment may be implemented using a software related product such as a computer readable memory (e.g., non-transitory computer readable memory), computer readable medium or a computer readable storage structure comprising computer readable instructions (e.g., program instructions) using a computer program code (i.e., the software or firmware) thereon to be executed by a computer processor.

Furthermore, the module 82e may be implemented as a separate block or may be combined with any other module/block of the UE 82 or it may be split into several blocks according to their functionality. Moreover, it is noted that all or selected modules of the UE 82 may be implemented using an integrated circuit (e.g., using an application specific integrated circuit, ASIC).

The other UEs, such as UE2 86, eNB1 80 and eNB10 80a may have similar components as the UE 82, as shown in FIG. 8, such that the above discussion about components of the UE 82 is fully applied to the components of the UE2 86, eNB1 80 and eNB10 80a. The discovery signal scheduling application module 87 in the devices 80 and 80a, is designed to facilitate performing corresponding functions for establishing corresponding discovery functions for establishing D2D communication as described herein and illustrated in FIGS. 1-7 herein (specifically see steps in FIG. 7). The module 87 may be implemented as a software, a firmware and/or a hardware module or a combination thereof. In particular, in the case of software or firmware, one embodiment may be implemented using software related product such as a computer readable memory (e.g., non-transitory computer readable memory), a computer readable medium or a computer readable storage structure comprising computer readable instructions (e.g., program instructions) using a computer program code (i.e., the software or firmware) thereon to be executed by a processor.

Furthermore, the module 87 may be implemented as a separate block or may be combined with any other module/block of the device 80 or 80a, or it may be split into several blocks according to their functionality. Moreover, it is noted that all or selected modules of the device 82, 86, 80 or 80a may be implemented using an integrated circuit (e.g., using an application specific integrated circuit, ASIC).

It is noted that various non-limiting embodiments described herein may be used separately, combined or selectively combined for specific applications.

Further, some of the various features of the above non-limiting embodiments may be used to advantage without the corresponding use of other described features. The foregoing description should therefore be considered as merely illustrative of the principles, teachings and exemplary embodiments of this invention, and not in limitation thereof.

It is to be understood that the above-described arrangements are only illustrative of the application of the principles of the present invention. Numerous modifications and alternative arrangements may be devised by those skilled in the art without departing from the scope of the invention, and the appended claims are intended to cover such modifications and arrangements.

What is claimed is:

1. A method comprising:
   receiving by a user equipment, from a wireless network, paging information including a paging cycle period; and
   monitoring by the user equipment during a common frame defined by the paging cycle period for a paging signal from the wireless network and for at least one discovery signal directly from at least one other user equipment operating in the wireless network, wherein a discovery cycle period of the at least one discovery signal is different than the paging cycle period and is determined using the paging cycle period based on a predefined rule.

2. The method of claim 1, wherein before said monitoring the method comprising:
   receiving by the user equipment information about a resource for the at least one discovery signal.

3. The method of claim 1, wherein the user equipment uses one receiver to receive the paging signal and the at least one discovery signal during a paging receiving time determined by the common frame.

4. The method of claim 1, wherein the at least one discovery signal comprises identification of a first type of services.

5. The method of claim 1, further comprising:
   sending a further discovery signal by the user equipment directly to other user equipments in the wireless network, wherein a further discovery cycle period of the further discovery signal is different than the paging cycle period and is determined based on a predefined rule.

6. The method of claim 5, wherein the further discovery cycle period is determined by the user equipment.

7. The method of claim 1, wherein the discovery cycle period is larger than the paging period.

8. The method of claim 1, wherein the paging cycle period is determined by a value of a discontinuous reception.

9. The method of claim 1, wherein the user equipment comprises one receiver to receive the paging signal and another receiver to receive the at least one discovery signal during a paging receiving time determined by the common frame.

10. An apparatus comprising:
    at least one processor and a memory storing a set of computer instructions, in which the processor and the memory storing the computer instructions are configured to cause the apparatus to:
    receive from a wireless network paging information including a paging cycle period; and
    monitor by the user equipment during a common frame defined by the paging cycle period for a paging signal from the wireless network and for at least one discovery signal directly from at least one other user equipment operating in the wireless network, wherein a discovery cycle period of the at least one discovery signal is different than the paging cycle period and is determined using the paging cycle period based on a predefined rule.

11. The apparatus of claim 10, wherein the discovery cycle period is smaller than the paging period.

12. An apparatus comprising:
    at least one processor and a memory storing a set of computer instructions, in which the processor and the memory storing the computer instructions are configured to cause the apparatus to:
    send to a plurality of user equipments paging information including a paging cycle period; and
    determine and provide to the plurality of user equipments one or more discovery cycle periods for sending discovery signals,
    wherein each of the one or more discovery cycle periods is different than the paging cycle period and is determined using the paging cycle period based on a predefined rule.

13. The apparatus of claim 12, wherein the one or more discovery cycle periods are different.

14. A method comprising:
    receiving by a user equipment from a wireless network paging information including a paging cycle period; and
    sending a discovery signal by the user equipment directly to other user equipments in the wireless network, wherein a discovery cycle period of the discovery signal is different than the paging cycle period and is determined using the paging cycle period based on a predefined rule.

15. The method of claim 14, wherein before the sending, the method comprises:
    receiving by the user equipment form the wireless network information about the discovery cycle period.

16. A method comprising:
    sending by at least one network element of a wireless network to a plurality of user equipments paging information including a paging cycle period; and
    determining and providing by the at least one network element to the plurality of user equipments one or more discovery cycle periods for sending discovery signals directly to one another,
    wherein each of the one or more discovery cycle periods is different than the paging cycle period and is determined using the paging cycle period based on a predefined rule.

17. The method of claim 16, wherein the one or more discovery cycle periods are equal.

18. The method of claim 16, wherein the one or more discovery cycle periods are determined using a denominator of paging cycle parameter over multiple adjacent cells.

19. The method of claim 16, wherein the paging cycle period for one of the plurality of user equipments is determined by a value of a discontinuous reception.

20. The method of claim 16, wherein the one or more discovery cycle periods are determined taking into consideration communication traffic in the wireless network.

* * * * *